Aug. 24, 1926.
C. H. RYMAL
1,597,112
ADVERTISING VEHICLE
Filed Dec. 19, 1925
4 Sheets-Sheet 1
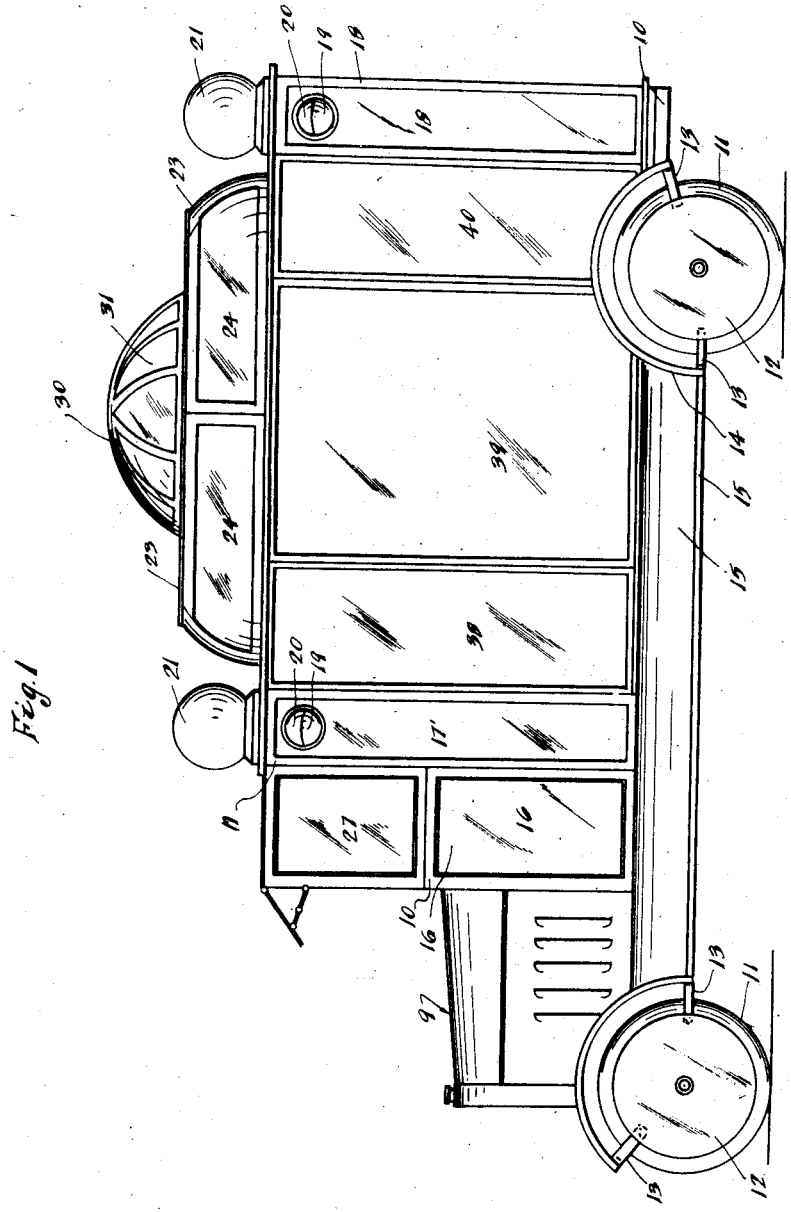
Inventor
Cecil Hardford Rymal

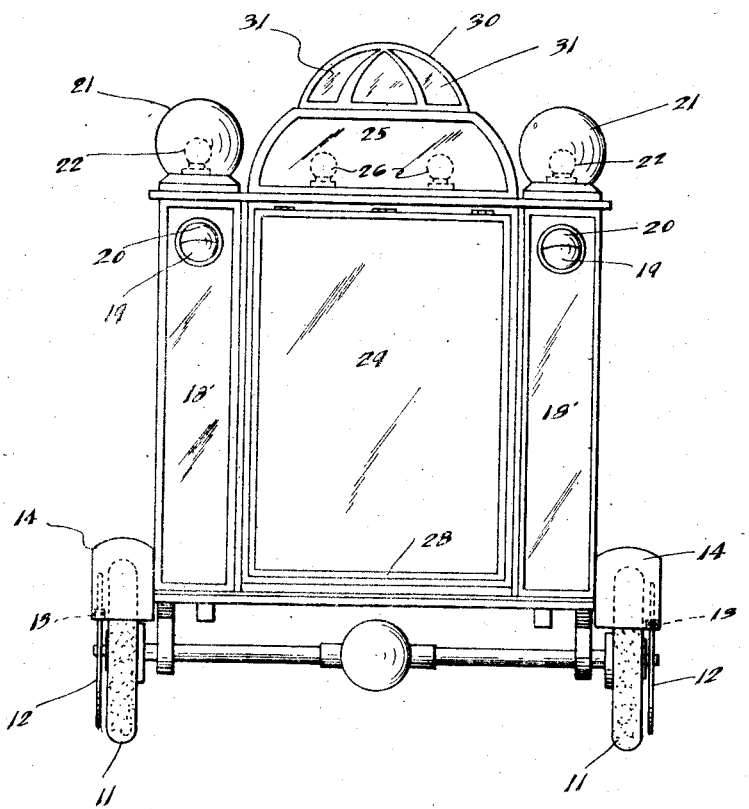

Aug. 24, 1926.
C. H. RYMAL
ADVERTISING VEHICLE
Filed Dec. 19, 1925
4 Sheets-Sheet 3
1,597,112
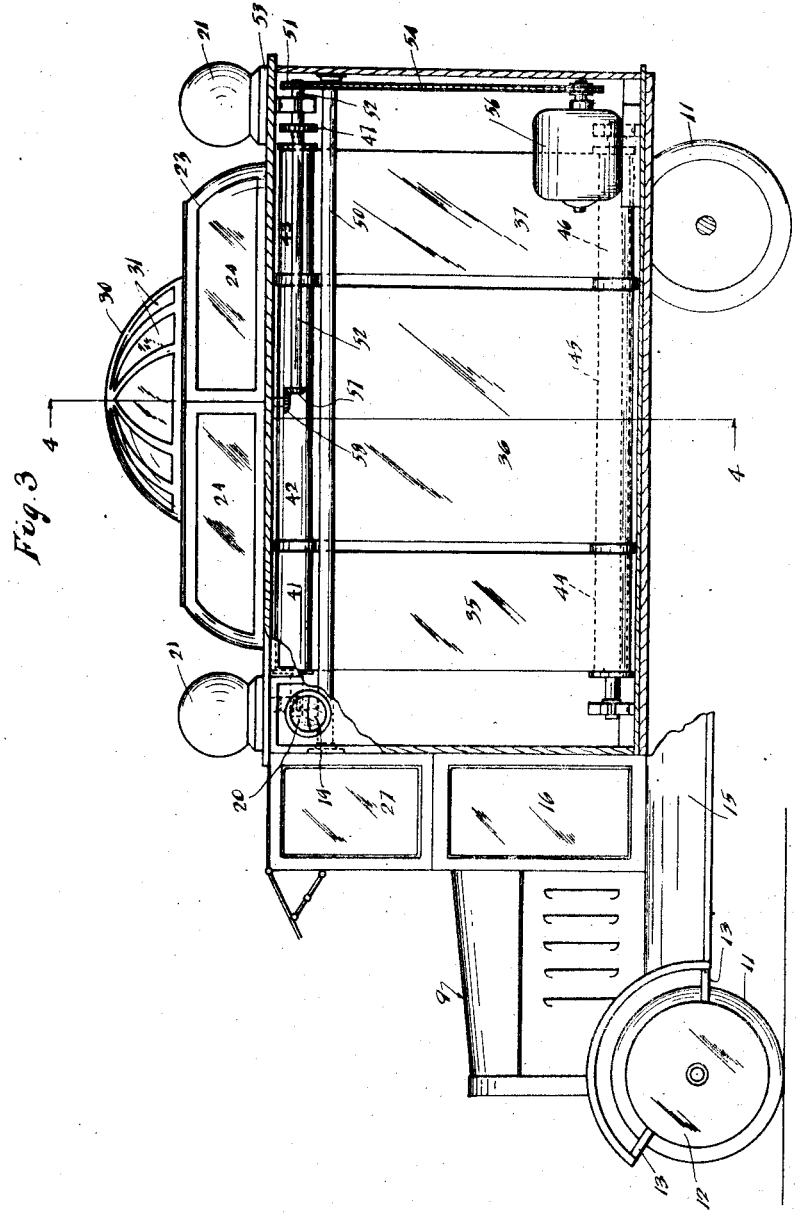
Witnesses:
Inventor:
Cecil Hardford Rymal
By
His Attorney Aug. 24, 1926.

C. H. RYMAL

ADVERTISING VEHICLE

Filed Dec. 19, 1925

Witnesses

Inventor:
Cecil Hardford Rymal

His Attorney

Patented Aug. 24, 1926.

1,597,112

UNITED STATES PATENT OFFICE.

CECIL HARDFORD RYMAL, OF CHICAGO, ILLINOIS, ASSIGNOR OF ONE-THIRD TO JAMES J. DUNBAR, SR., OF CHICAGO, ILLINOIS, AND ONE-THIRD TO WESLEY A. L. LEHMANN, OF FOREST PARK, ILLINOIS.

ADVERTISING VEHICLE.

Application filed December 19, 1925. Serial No. 76,355.

My invention relates to an advertising vehicle, and more particularly to a vehicle containing movable means and stationary means arranged and adapted for containing and displaying advertising matter; and the main object is to provide a traveling vehicle which has stationary parts or means for displaying advertising matter, and also has movable parts or means for containing various advertising matter and which is continuously movable to display the various advertising features in succession, and preferably by having a rotatable surface bearing the advertising matter so as to move it successively into view and out of view.

Other objects will appear hereinafter.

The invention consists in the combinations and arrangements of parts hereinafter described and claimed.

The invention will be best understood by reference to the accompanying drawings forming a part of this specification, and in which, Fig. 1 is a side elevation of my invention;

Fig. 2 is an end elevation thereof;

Fig. 3 is a side elevation, partly broken away;

Figure 5:
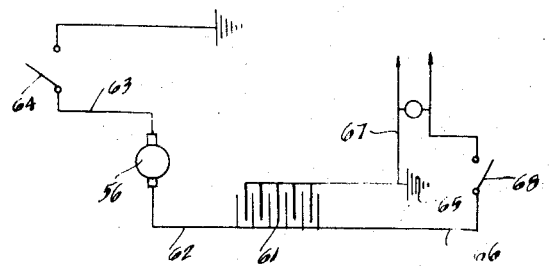
Figure 4:
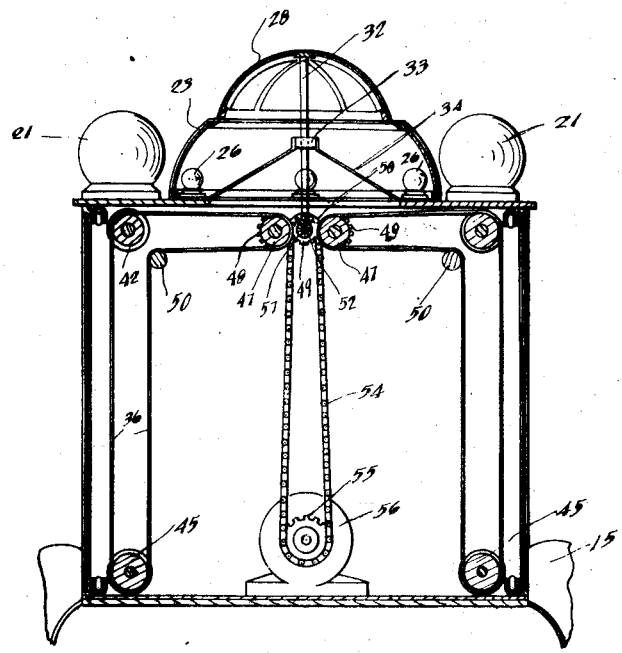
Fig. 4 is a vertical cross sectional view taken substantially on line 4—4 of Fig. 3; and, Fig. 5 is a diagrammatic view of the electric driving and lighting means used in my advertising vehicle.

The form of construction illustrated in the drawings comprises an automobile or vehicle 9 including a body 10 and wheels 11. Stationary discs 12 are mounted on the outside of wheels 11 by means of straps or brackets 13 supported on the mudguards 14 and the running board 15. The stationary discs 12 are adapted and arranged to bear advertising matter, and likewise are the curved flanges 15' which extend upwardly from the running boards to the body of the vehicle.

The body 10 of the truck comprises the main advertising features or means including stationary means and movable means, and the stationary means includes panels 16 provided at the sides of the driver's cabin, and columns or posts 17 and 18 at the front and at the rear of the body, which are provided with panels 17' and 18'. These panels are preferably made of opaque material such as wood or metal, and lights 19 with deflectors 20 thereover are provided at the upper ends of the columns for deflecting the rays of light downwardly. A globe or head 21 is mounted on the top of each column, and preferably consists of transparent material, adapted to receive advertising matter thereon, and a light 22 is mounted in said globe to illuminate and display the advertising matter thereon. A curved top or cover 23 is mounted over the top of a vehicle body 10 and is provided with side panels 24 and end panels 25, which are preferably stationary and arranged to receive and display advertising matter. Said panels 24 and 25 preferably consist of transparent material, and lights 26 are mounted inward thereof to illuminate the panels and the advertising matter thereon. A glass or transparent panel 27 is provided on each side of the driver's cabin, and is also adapted to contain advertising matter thereon. A door or back member 28 is hinged on the rear of the body as indicated and is provided with a panel 29 adapted to display advertising matter.

In addition to the above outlined stationary means or members for bearing advertising matter, I also provide movable means for bearing advertising matter, and this includes a cupola or dome 30 mounted to rotate on the curved top 23, and provided with transparent panels 31 for bearing advertising matter. The cupola is rotated or driven by means of any suitable mechanism, as a shaft 32 fastened to the top of the cupola and rotating in a bearing 33 supported by means of brackets 34 on top of the vehicle body. The movable advertising means further includes a plurality of endless flexible members or belts 35, 36 and 37, arranged to travel at each side of the body and spaced slightly inward from transparent side panels 38, 39 and 40. The endless members 35, 36 and 37 rotate over suitable upper rollers 41, 42 and 43 and lower rollers 44, 45 and 46, and are driven by intermediate rollers 47 provided with gears 48 meshing with a common drive gear 49 placed between said gears 48. Idlers 50 are also provided to keep the endless members or belts taut. A sprocket 51 is connected with a shaft 52 to drive gear 49 and has said shaft supported in a bracket 53 at the top of the vehicle body. A chain 54 drives sprocket 51 and is driven by a sprocket 55 actuated by a suitable driving motor 56. A bevel gear 57 is mounted on the inner end of shaft 52 and drives a bevel pinion 58 on the lower end of shaft 32 to rotate the cupola 28. Lights 59 are mounted with reflectors 60 at the top and bottom adjacent the sides of the vehicle body for illuminating the movable endless members and the advertising matter thereon.

Any suitable means may be employed for driving the motor 56 and energizing the lights provided for illuminating the advertising matter, and in Fig. 5 I have diagrammatically indicated means for actuating said motor and lights. As shown in said Fig. 5, the motor 56 may be connected with a battery 61 by means of a conductor 62 and may be grounded by a conductor 63, a switch 64 being provided, in a position readily operable from the driver's seat, for opening and for closing the motor circuit. The battery may be grounded as indicated at 65. A conductor 66 extends from the battery to the lights on the automobile and a conductor 67 extends from the lights back to the battery, a switch 68 being provided for opening and closing the light circuit, and the lights are preferably arranged in series with conductors 66 and 67, as indicated in Fig. 5.

Having described my invention, what I claim as new and desire to secure by Letters Patent is:

1. A vehicle with a body having a cupola rotatably mounted thereon and provided with means to bear advertising matter, endless flexible means mounted at the sides of said body and arranged to display advertising matter, and gear means for driving said cupola and said endless flexible means in unison.

2. A vehicle with a body having a cupola rotatably mounted thereon and provided with means to bear advertising matter, endless flexible means mounted at the sides of said body and arranged to display advertising matter, gear means for driving said cupola and said endless flexible means in unison, and power means for driving said gear means.

3. A vehicle comprising a body having a cupola movably mounted thereon, panels on said cupola for bearing advertising matter, columns with stationary panels on said body for bearing advertising matter, transparent panels on said body and movable means mounted inward thereof for displaying advertising matter through said transparent panels, and electric lights for illuminating all of said panels and advertising matter.

4. A vehicle comprising a body with columns thereon, panels on said columns for displaying advertising matter, lights on said columns for illuminating said matter, glass panels on said body, movable means inward of said glass panels for displaying advertising matter therethrough, lights on said body for illuminating said matter, a curved top on said body with panels for displaying advertising matter, a cupola rotatably mounted on said curved top and having panels for displaying advertising matter, and lights for illuminating the panels on said curved top and on said cupola.

In testimony whereof I have signed my name to this specification.

CECIL HARDFORD RYMAL.